US009562638B2

(12) United States Patent
Tiberghien et al.

(10) Patent No.: US 9,562,638 B2
(45) Date of Patent: Feb. 7, 2017

(54) CONNECTING DEVICE, AND CONNECTOR COMPRISING SUCH A DEVICE

(71) Applicant: STAUBLI FAVERGES, Faverges (FR)

(72) Inventors: Alain-Christophe Tiberghien, Sevrier (FR); Christophe Durieux, Gilly sur Isere (FR); Igor Bahno, Albertville (FR)

(73) Assignee: STAUBLI FAVERGES, Faverges (FR)

( * ) Notice: Subject to any disclaimer, the term of this patent is extended or adjusted under 35 U.S.C. 154(b) by 411 days.

(21) Appl. No.: 14/220,805

(22) Filed: Mar. 20, 2014

(65) Prior Publication Data

US 2014/0284917 A1    Sep. 25, 2014

(30) Foreign Application Priority Data

Mar. 22, 2013    (FR) ...................................... 13 52581

(51) Int. Cl.
*F16L 37/18* (2006.01)
*F16L 19/02* (2006.01)

(52) U.S. Cl.
CPC ............ *F16L 37/18* (2013.01); *F16L 19/0225* (2013.01)

(58) Field of Classification Search
CPC ............................... F16L 37/18; F16L 19/0225
USPC .................................................. 285/312, 17
See application file for complete search history.

(56) References Cited

U.S. PATENT DOCUMENTS

| 559,911 | A | | 5/1896 | Sheridan | |
|---|---|---|---|---|---|
| 2,333,423 | A | * | 11/1943 | Hufferd | ................... F16L 37/16 137/614.04 |
| 3,425,717 | A | | 2/1969 | Bruce | |
| 3,751,077 | A | * | 8/1973 | Hiszpanski | ......... F16L 19/0206 285/148.9 |
| 4,575,130 | A | * | 3/1986 | Pemberton | .............. F16L 37/18 141/349 |
| 5,350,200 | A | | 9/1994 | Peterson | |
| 6,298,876 | B1 | * | 10/2001 | Bogdonoff | .............. F16L 37/18 137/614.04 |
| 2013/0099482 | A1 | * | 4/2013 | Tiberghien | .............. F16L 37/18 285/312 |
| 2013/0174928 | A1 | * | 7/2013 | Danielson | ........... F16L 37/1215 137/798 |

* cited by examiner

*Primary Examiner* — David E Sosnowski
*Assistant Examiner* — James Linford
(74) *Attorney, Agent, or Firm* — Dowell & Dowell, PC (57) ABSTRACT

A connecting device for transmitting pressurized fluids including a pipe having an inner flow channel, a body including an inner cavity isolated from the inner flow channel, and a displacement member for moving the pipe in the body between an unlocked configuration and a locked configuration and wherein the displacement member includes a pusher member movable within the body, an off-centered member connected to the slide member, a connecting rod ring and a rear housing formed in the body, defining a first articulation diameter ($\phi 1$) between the pusher member and the off-centered member around a first axis (A1), a second articulation diameter ($\phi 2$) between the off-centered member and the connecting rod member around a second axis (A2), and a third articulation diameter ($\phi 3$) between the connecting rod ring and the rear housing around a third axis (A3) and wherein the three axes are separate and parallel to a transverse direction transverse of the device.

13 Claims, 8 Drawing Sheets

CONNECTING DEVICE, AND CONNECTOR COMPRISING SUCH A DEVICE

BACKGROUND OF THE INVENTION

Field of the Invention

The present invention relates to a connecting device. The invention also relates to a connector comprising such a device.

The field of the invention is that of connectors adapted for the passage of fluids under high pressures and high or very low temperatures, which require maximum safety and demand sealing using metal parts. Advantageously, such sealing is achieved by metal-on-metal contact without using a seal made from a polymer material. The invention is well suited to specific applications in the field of cryogenics.

Brief Description of the Related Art

GB-A-163,053 describes a connecting device between two tubes. A first tube is screwed into a main coupling element provided with a first frustoconical surface. The second tube is screwed into a coupling ring provided with a second frustoconical surface and mounted sliding in the main element. The device also comprises a cam lever, mounted on the coupling element the second tube is inserted into the ring. Actuating the cam lever causes the two frustoconical surfaces to come closer together, then applying contact pressure, thereby producing cone trunk-on-cone trunk sealing within the device. In practice, this sealing requires exerting high forces on the cam lever on the contact surfaces. The contacts between the cam supported by the lever and the ring to be moved are linear contacts, which poses a problem of compactness and/or strength when the materials, in particular for reasons of compatibility with certain fluids, do not have a sufficient hardness to withstand caulking.

U.S. Pat. No. 5,350,200 describes another connecting device between two tubes, provided with complementary frustoconical surfaces. The connecting device comprises two annular sleeves, each including a cavity for receiving one of the tubes. The annular sleeves also comprise complementary internal and external threads. Screwing the annular sleeves causes the two frustoconical surfaces to come closer together, then applying contact pressure, thereby producing cone trunk-on-cone trunk sealing within the device.

As a non-limiting example, very low temperature applications may use austenitic stainless steels, for example of type 316L, with high stiffness under cryogenic temperatures, but a low hardness.

SUMMARY OF THE INVENTION

The aim of the present invention is to propose an improved connecting device, in particular for high temperature or very low temperature applications.

To that end, the invention relates to a connecting device adapted for transmitting pressurized fluids. This connecting device is configured to be coupled with a complementary connecting element, with a first part among the device and the connecting element that is configured to be a male element adapted for being connected to a first line, and a second part among the device and the connector element that is configured to be a female element adapted for being connected to a second line. This connecting device comprises:

a pipe end delimiting an inner flow channel for a fluid in the connecting device and including a bearing surface for the connector element;

an end body including a threaded surface for engaging with a body of the connector element and an inner cavity that extends globally along a longitudinal axis of the connecting device and is isolated from the inner flow channel of the fluid in the coupled configuration; and means for moving the pipe end in the cavity of the end body along the longitudinal axis in a forward direction between an unlocked configuration and a locked configuration.

This connecting device is characterized in that the displacement means comprise at least one pusher member, one off-centered member, one connecting rod ring member and one rear housing that is formed in the end body, defining:

a first articulation diameter between the pusher member and the off-centered member around a first axis, a second articulation diameter between the off-centered member and the connecting rod ring member around a second axis, and a third articulation diameter between the connecting rod ring member and the rear housing around a third axis;

in that the first, second and third axes are separate and parallel to a direction transverse to the longitudinal axis;

in that the distance between the first axis and the second axis is smaller than the half-sum of the first diameter and the second diameter;

in that the distance between the second axis and the third axis is smaller than the half-sum of the second diameter and the third diameter; and in that the pivot member is movable only in translation along the longitudinal axis relative to the end body and is capable of pushing the pipe end back in the direction.

Thus, the connecting device according to the invention has many advantages, which will emerge from the description below. In particular, the connecting device makes it possible to obtain a reliable and ergonomic connection between two connector elements, by implementing displacement means procuring reduced contact pressures and significant compactness.

According to other advantageous features of the connecting device according to the invention, considered alone or in combination:

The off-centered member comprises a first cylindrical surface that cooperates with the pusher member to form the articulation with a first diameter and a second cylindrical surface that cooperates with the connecting rod ring member to form the articulation with a second diameter, and the first cylindrical surface surrounds or is surrounded by the second cylindrical surface of the off-centered member.

The connecting rod ring member comprises a first cylindrical surface that cooperates with the off-centered member to form the articulation with a second diameter and an outer surface including a second cylindrical surface that cooperates with the rear housing to form the articulation with a third diameter, and the outer surface of the connecting rod ring member surrounds the first cylindrical surface of the connecting rod member.

The rear housing, the first cylindrical surface and the second cylindrical surface of the connecting rod ring member, the first cylindrical surface and the second cylindrical surface of the off-centered member are positioned at the same level in a direction parallel to the first, second and third axes.

The first axis and the third axis are situated in a plane substantially parallel to the longitudinal axis of the connecting device, the second axis is situated on one side of the plane in the unlocked configuration of the displacement means, and the second axis is situated on the other side of the plane in the locked configuration of the displacement means.

The distance between the first axis and the second axis is smaller than the distance between the second axis and third axis.

The pusher member comprises at least one cylindrical part centered on the first axis; the off-centered member comprises a bore receiving the cylindrical part of the pusher member to form the articulation with a first diameter and an outer surface surrounding the bore and centered on the second axis; the connecting rod ring member comprises a bore receiving the outer surface of the off-centered member to form the articulation with a second diameter and an outer surface surrounding the bore; and the rear housing is formed by a bore centered on the third axis and capable of cooperating with a cylindrical surface of the outer surface of the connecting rod ring member to form the articulation with a third diameter.

The off-centered member forms a handling lever for the displacement means between the unlocked configuration and locked configuration and comprises two lever arms situated on either side of the end body, each lever arm cooperating with the pusher member; and the displacement means comprise two connecting rod ring members each cooperating with one of the lever arms of the off-centered member, and two rear housings emerging outside the end body and each cooperating with one of the connecting rod ring members.

The two lever arms are connected by a shaft forming a handle, which abuts against the end body in the locked configuration of the displacement means.

The off-centered member includes at least one stop bearing against a surface of the connecting rod ring member in the unlocked configuration of the displacement means.

The connecting device comprises elastic return means for returning the displacement means to the unlocked configuration.

The invention also relates to a connector adapted for transmitting pressurized fluids. According to the invention, the connector comprises a connecting device as mentioned above, as well as a complementary connector element that is capable of being coupled to the connecting device and that comprises a pipe defining a bearing surface complementary to the bearing surface of the connecting device. The bearing surface of the complementary connector element and the bearing surface of the connecting device are in cone trunk-on-cone trunk contact or in sphere portion-on-cone trunk contact to form the connection between the pipe end and the pipe.

According to one advantageous alternative of the connector mentioned above, the complementary connector element comprises a locking mechanism movable between a position locking the pipe of the complementary connector element inserted in a body of the complementary connector element relative to said body of the complementary connector element, in at least one direction parallel to a longitudinal axis of the complementary connector element and opposite the connecting device, on the one hand, and a position where the locking mechanism allows the pipe of the connector element to be removed outside the body of the complementary connector element on the other hand.

BRIEF DESCRIPTION OF THE DRAWINGS

The invention will be better understood upon reading the following description, provided solely as a non-limiting example and done in reference to the appended drawings, in which.

DESCRIPTION OF THE PREFERRED EMBODIMENT

FIGS. 1 to 8 show a connector 1 according to the invention.

This connector 1 comprises a connector element 2 and a connecting device 10, which is also according to the invention. The element 2 is configured as a male connector end, while the device 10 is configured as a female connector end, adapted for receiving the element 2. The device 10 is provided to be connected to a first line, while the element 2 is provided to be coupled to the connecting device 10 and to be connected to a second line, these lines not being shown in FIGS. 1 to 8 for simplification purposes. The connector 1 is shown in a separated configuration in FIGS. 1, 2 and 7, during coupling in FIG. 3, and in a coupled configuration in FIGS. 4, 5 and 8.

The element 2 and the device 10 are the two component elements of the connector 1 adapted for transmitting gaseous and/or liquid fluids under high pressures and high temperatures (up to 450° C.) or very low temperatures (for example up to −250° C.) when the connector 1 is in the coupled configuration. In this case, the device 10 is connected to the first line, while the element 2 is coupled to the connecting device 10 and connected to the second line, such that the fluid can pass through the connector 1 from one line to the other. The component elements 2 and 10 of the connector 1 are made from metal, so as to withstand high pressures and high temperatures or very low temperatures. As one non-limiting example, very low or very high temperature applications may use austenitic stainless steels, for example of type 316L.

As shown in FIGS. 1 to 5, the connector element 2 comprises a body 3 and a pipe 4 that are globally centered on a longitudinal axis X2. The body 3 defines a front side of the element 2, while the pipe 4 extends toward the rear of the element 2.

The body 3 includes an inner cavity 3a, an annular surface 3b and an inner bore 3c. The annular surface 3b extends radially to the axis X2 between the cavity 3a and the bore 3c, which are centered on the axis X2. The surface 3b is oriented from the front side of the element 2. The body 3 also includes an outer peripheral threading 5, forming an engaging profile complementary to an engaging profile 25 formed on the device 10, as described hereinafter.

The pipe 4 comprises a head 6 positioned in the cavity 3a of the body 3, as well as a tube 7 that extends toward the rear from the head 6 through the bore 3c. The pipe 4 is passed through by an inner channel 8 that extends along the axis X2 between a front mouth 8a and a rear mouth 8b. The front mouth 8a of the channel 8 emerges at the head 6 and is provided to be coupled to the device 10. The rear mouth 8b of the channel 8 emerges from the tube 7 opposite the head 6 and is connected to the channel, not shown. The head 6 includes an outer cylindrical surface 6a centered on the axis X2, as well as a rear annular surface 6b that extends radially to the axis X2. The surface 6a is received in the cavity 3a, while the surface 6b is provided to abut against the surface 3a of the body 3. A slot 7a receiving a circlips 7b with a globally annular shape is formed in the tube 7, emerging at its outer surface. The circlip 7b does not form a complete ring in order to facilitate its insertion in the slot 7a. When the pipe 4 is movable relative to the body 3 along the axis X2, the tube 7 is movable in the bore 3c, while the surface 6a is movable in the cavity 3a. The movement of the pipe 4 in the forward direction is limited by the presence of the circlips 7b, while the movement of the pipe 4 toward the rear is limited by the presence of the surface 3b receiving the abutting surface 6b. The body 3 is mounted with the possibility of rotation around the axis X2 relative to the pipe 4.

Figure 3:
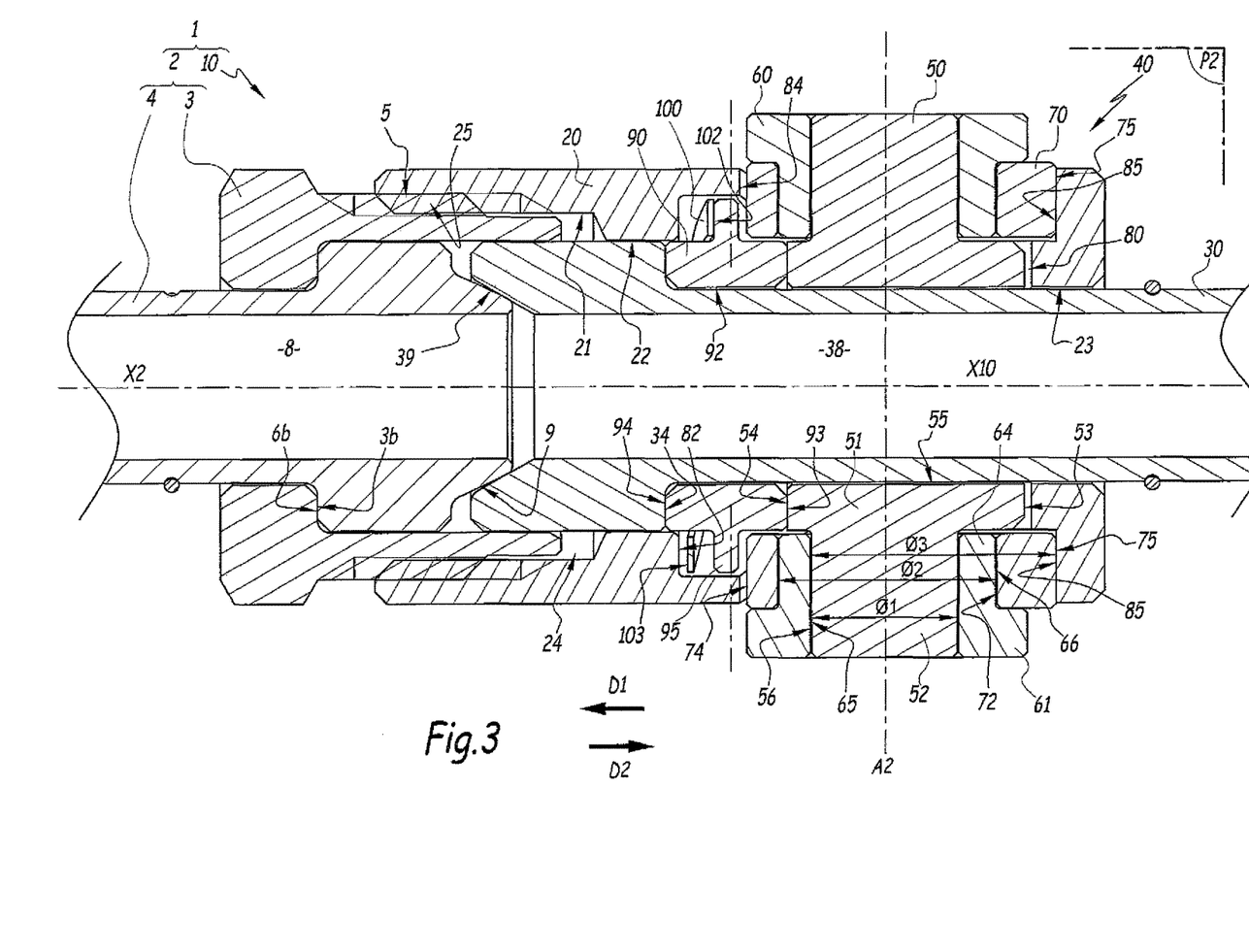
FIG. 3 is a partial axial cross-section of the connector in a plane perpendicular to the plane of FIG. 2, on a larger scale, showing the connector during coupling, with the lever in the unlocked position.
Figure 5:
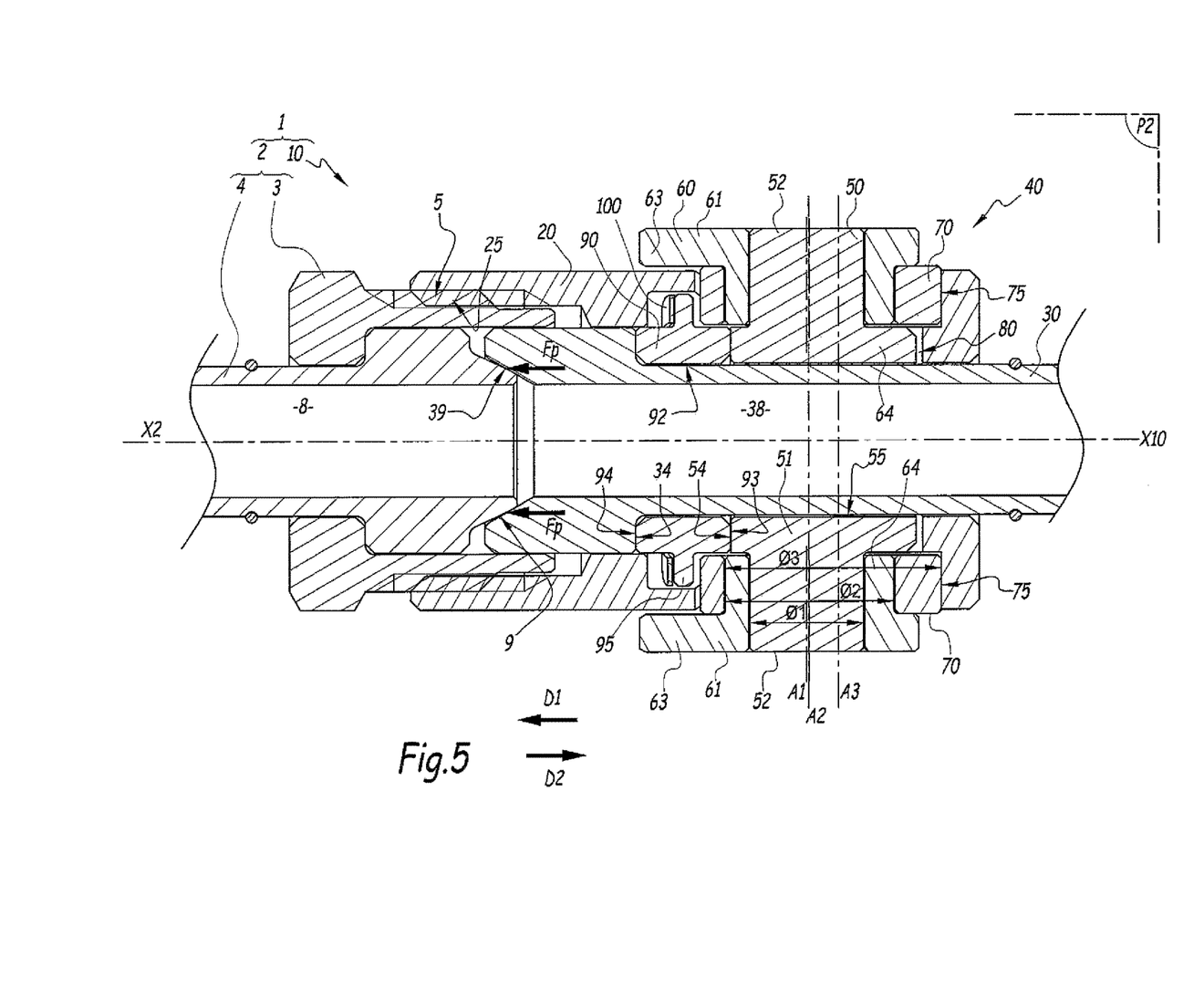
FIG. 5 is a partial axial cross-section along line V-V in FIG. 4, in a plane similar to FIG. 3, on a smaller scale.

The head 6 also includes a surface 9, in the form of a sphere portion centered on the axis X2, oriented toward the front and outside of the element 2. The spherical surface 9 narrows moving away from the tube 7. The spherical surface 9 constitutes a bearing part for a complementary frustoconical surface 39 belonging to the device 10, as shown in FIGS. 3 and 5. Such spherical/frustoconical sealing by metal-on-metal contact is well suited to high pressure and high temperature or very low temperature fluids. Furthermore, the sphere portion-on-cone trunk sealing does not require a seal, resulting in lighter maintenance.

The connecting device 10 extends globally along a longitudinal central axis X10, which is aligned with the axis X2 of the connector element 2 when the connector 1 is in the coupled configuration. The connecting device 10 comprises an end body 20, a pipe end 30 that is movable relative to the body 20, and a displacement mechanism 40 for moving the pipe 30 relative to the body 20 in the longitudinal direction defined by the axis X10. The pipe 30 is passed through, along the axis X10, by a main channel 38 for the flow of fluid in the device 10. In the coupled configuration of the connector 1 shown in FIG. 5, the channel 8 and the channel 38 are connected suitably, thus allowing the flow of fluid in the connector 1.

The tapped end body 20 has a globally tubular shape. The body 20 extends along the axis X10 between a front end 20a for coupling to the element 2, and a rear end 20b for sliding of the pipe 30 along the axis X10. The body 20 comprises a first bore 21 situated on the side of the end 20a, a second intermediate bore 22 and a third bore 23 situated on the side of the end 20b. The bores 21, 22, 23 are centered on the axis X10. The diameter of the bore 21 is larger than the diameter of the bore 22, which is larger than the diameter of the bore 23, these diameters being measured around the axis X10. Between the bores 22 and 23, a housing 80 is formed, emerging on either side of the body 20, as described hereinafter. The bores 21, 22, 23 and the housing 80 delimit an inner cavity 24 said to be dry, in that that cavity 24 is isolated from the flow channel 38 of the fluid circulating in the device 10. This cavity 24 passes through the body 20 all the way along the longitudinal axis X10, between the ends 20a and 20b. The pipe 30 may translate along the axis X10 relative to the end body 20, while being guided in the bores 22 and 23.

The body 20 comprises an engaging profile 25, which is more precisely an inner threading, i.e., a tapping, formed around the axis X10 at the surface of the first bore 21 on the side of the end 20a. The engaging profile 25 formed on the body 20 is complementary to the engaging profile 5 formed on the body 3 of the element 2, for coupling of the element 2 and the device 10 forming the connector 1.

The housing 80 formed in the body 20 is provided to receive the different component elements of the mechanism 40. The housing 80 includes a first bore 81 centered on the axis X10, a shoulder 82 that extends radially to the axis X10 between the bore 81 and the bore 22, two portions 83 with a frustoconical inner surface centered on the axis X10, a second bore 84 formed in a direction radial to the axis X10 and the bore 81 and portions 83 and emerging on either side of the body 20, as well as two side rear housings 85 formed in a direction radial to the axis X10 by bores with a partially cylindrical profile. Each bore 85 emerges on the one hand outside the body 20, and on the other hand in the body 20 at the bore 84. The bores 85 are both centered on an axis A3 that is perpendicular to the axis X10 and that is offset from the axis of the bore 84 along the axis X10.

For the end body 20, a forward direction D1, parallel to the axis X10 and oriented from the rear end 20b toward the front end 20a, is defined, as well as a rear direction D2 oriented in the direction opposite D1.

The pipe end 30 comprises a head 31 provided to be connected to the pipe 4 of the element 2 and a rear tube 32 connected to the channel (not shown). The head 31 and the tube 32 each have a tubular shape centered on the axis X10. The head 31 includes an outer cylindrical surface 33 centered on the axis X10, as well as a rear shoulder 34 with a globally annular shape that extends radially to the axis X10 between the surface 33 and the tube 32. The tube 32 protrudes past the rear end 20b of the body 20 at the bore 23. In other words, the pipe 30 is partially housed in the body 20, without being surrounded by the fluid circulating in the channel 38. The tube 32 includes an outer cylindrical surface 35 centered on the axis X10, with a diameter smaller than that of the surface 33 of the head 31. A slot 36 receiving a circlips 37 with an annular shape is formed in the tube 32, while emerging on the surface 35. The circlips 37 does not form a complete ring so as to facilitate its insertion into the slot 36. When the pipe 30 is movable relative to the body 20 along the axis X10, along one of the directions D1 or D2, the surface 33 is movable in the bore 22, while the surface 35 is movable in the bore 23. The movement of the pipe 30 in the direction D1 is limited by the presence of the circlips 37, while the movement of the pipe 30 in the direction D2 is limited by the presence of the mechanism 40.

The pipe end 30 is crossed through by the inner channel 38, which extends along the axis X10 between a front mouth 38a and a rear mouth 38b. The channel 38 delimits the fluid flow channel in the connecting device 10. The front mouth 38a of the channel 38 emerges at the head 31 and is provided to be coupled to the element 2. The rear mouth 38b of the channel 38 emerges from the tube 32 opposite the head 31 and is connected to the line (not shown). The frustoconical surface 39 is arranged at the front mouth 38a of the channel 38, inside and in front of the head 31. The frustoconical surface 39 is flared in the direction D1 opposite the tube 32, thereby forming a complementary bearing part of the surface 9 of the element 2.

In practice, no fluid flows in the dry inner cavity 24 of the body 20 and on the outer surfaces 33, 34 and 35 of the pipe 30. The channel 38 is isolated from the dry inner cavity 24 when the device 10 is in the coupled configuration with the complementary element 2. In other words, the pipe 30 is different from a valve.

As shown in FIGS. 3 to 8, the mechanism 40 for moving the pipe 30 in the body 20 comprises a pusher member 50, an off-centered lever 60, two connecting rod rings 70, a housing 80 formed in the body 20, a washer 90 and a spring 100.

The pusher member 50 is positioned in the body 20 and surrounds the pipe 30. More specifically, the pusher member 50 is housed partially in the housing 80 and emerges on either side of the housing 80 at the bores 85. The pusher member 50 comprises a central part 51 framed by two cylindrical side parts 52. The central part 51 includes an outer surface 53 forming a cylindrical portion and a front planar surface 54, perpendicular to the axis X10, which are crossed through by a bore 55. The tube 32 of the pipe 30 crosses, with reduced play, through that bore 55 along the axis X10. Each side part 52 includes a cylindrical outer surface 56 coaxial with the surface 53. The side parts 52 are mounted in the lever 60, as outlined hereinafter. The side parts 52 and their cylindrical surfaces 56 are centered on an axis A1. The front planar surface 54 is in contact with the washer 90, which in turn bears against the surface 34 of the pipe 30 in a configuration withdrawn from the pipe 30. The front planar surface 54 is capable of pushing the pipe 30 back in the forward direction D1. The contacts between the elements 50, 90 and 30 are surface contacts.

The off-centered lever 60 is rotatably mounted around the axis A1 by actuation from the operator, on the one hand in a locking direction L1 toward a locked position, and on the other hand in an unlocking direction L2 opposite the direction L1 toward an unlocked position. The lever 60 comprises two lever arms 61 connected by a handle 62. The handle 62 is formed by a cylindrical shaft that extends between the arms 61 in a direction transverse to the central axis X10. For simplification purposes, in FIGS. 1 and 4, one of the arms 61 is not shown, while the handle 62 is shown in cross-section.

Each lever arm 61 includes an elongated part 63 and an off-centered cylindrical part 64, secured to each other. The elongated part 63 is situated on the outer side of the device 10, while the off-centered part 64 is situated on the inner side of the elongated part 63 relative to the central axis X10. The elongated part 63 is situated outside the housing 80, while the off-centered part 64 penetrates the bore 85 of the housing 80. The arm 61 is crossed through, both in its elongated part 63 and its off-centered part 64, by a bore 65 centered on the axis A1. The bore 65 is provided to receive one of the side parts of the slide member 50, such that the surface 56 and the bore 65 pivot relative to one another around the axis A1. The off-centered part 64 includes an outer cylindrical surface 66 centered on an axis A2 that is parallel but offset relative to the axis A1. In other words, the bore 65 and the cylindrical surface 66 are off-centered. The cylindrical surface 66 completely surrounds the bore 65, and in particular is positioned at the same level as the bore 65 in a transverse direction parallel to the axes A1, A2 and A3, i.e., in the same region along the transverse direction. In other words, a plane perpendicular to that transverse direction intersects the bore 65 and the cylindrical surface 66. Each off-centered part 64 of the lever 60 is mounted in a connecting rod ring 70, as outlined hereinafter. The elongated part 63 includes an orifice 67 formed opposite the off-centered part 64 and the bore 65 along that elongated part 63. The handle 62 is fastened at each of its ends to one of the arms 61 by a screw 68 crossing through the orifice 67. The screw fastening 68 makes it possible to keep the off-centered lever 60 and the connecting rod rings 70 mounted around the pusher member 50.

Each lever arm 61 also includes a cylindrical pin 69, positioned on the inner side of the lever 60, next to the off-centered part 64. Each pin 69 is provided to cooperate with one of the connecting rod rings 70, as described below. The pin 69 shown in FIGS. 1, 4, 7 and 8 belongs to an arm 61 not shown for simplification reasons.

The connecting rod rings 70 are mounted on the off-centered parts 64 of the lever 60. Each connecting rod ring 70 is housed with play in the bore 84 and in one of the bores 85 of the housing 80 formed in the body 20. Each connecting rod ring 70 includes an inner bore 72, as well as an outer surface 73 comprising a front outer surface 74 and a rear outer surface 75 connected by two planar surfaces 76. The bore 72 and the surface 74 are centered on the axis A2. The surfaces 74 and 75 form cylinder portions, with the surface 75 having a diameter smaller than the surface 74. The bore 72 is provided to pivot around the surface 66 of the off-centered part 64. The surface 75 is off-centered relative to the axis A2 and is provided to slide in the bore 85 of the housing 80 around the axis A3. Each connecting rod ring 70 is rotatable on the one hand relative to the off-centered part 64, around the cylindrical surface 66 and the axis A2, and on the other hand, relative to the end body 20, around the axis A3 stationary relative to the housing 80 when the sliding surface 75 is in contact with the bore 85. The outer surface 73 of the connecting rod ring 70, formed by the surfaces 74, 75 and 76, is positioned around the bore 72. In particular, the rear outer surface 75 is positioned at the same level as the bore 72 in a transverse direction parallel to the axes A1, A2 and A3, i.e., in the same region along that transverse direction. In other words, a plane perpendicular to that transverse direction intersects the bore 72 and the rear surface 75. The rear surface 75, in its extension around the axis A3, is secant with the cylindrical surface formed by the bore 72 and, in an alternative that is not shown, completely surrounds the cylindrical surface formed by the bore 72.

The washer 90 is positioned in the housing 80 and comprises a main globally tubular part 91, which is crossed through by a cylindrical bore 92 centered on the axis X10. The part 91 extends along the axis X10 between two globally annular end surfaces 93 and 94, which extend radially to the axis X10. The bore 92 is crossed through by the tube 32 of the pipe 30. The surface 93 is oriented toward the rear of the device 10 and positioned bearing against the surface 54 of the pusher member 50. The surface 94 is oriented toward the front of the device 10 and positioned bearing against the surface 34 of the pipe 30. The washer 90 also comprises a flange 95 that extends radially to the axis X10 from an outer surface of the part 91, substantially midway between the surfaces 93 and 94. The flange 95 is situated across from the bore 81 of the housing 80 radially to the axis X10. On two sides of the washer 90 that are diametrically opposite relative to the axis X10, the part 91, the surfaces 93 and 94 and the flange 95 are truncated by two planar surfaces 96. The surfaces 96 are parallel to each other and to the axis X10.

The spring 100 is positioned in the housing 80, on the washer 90. The spring 100 has a globally annular shape centered on the axis X10. The spring 100 includes an inner orifice 101, a rear side 102 and a front side 103. The orifice 101 is provided to receive the main part 91 of the washer. The spring 100 is positioned on the washer 90, on the side of the flange 95 that is closer to the surface 94 than the surface 93. The rear side 102 is positioned in contact with the flange 95. The front side 103 is positioned in contact with the surface 82 of the housing 80 formed in the end body 20.

The axis of rotation A1 between the pusher member 50 and the off-centered lever 60, the axis of rotation A2 between the off-centered lever 60 and the connecting rod rings 70, and the axis of rotation A3 between the connecting rod rings 70 and the body 20 are separate, i.e., not aligned. The axes A1, A2 and A3 are substantially parallel to each other and parallel to a direction transverse to the device 10, i.e., perpendicular to a plane P1 including the central axis X10. In the case at hand, the axes A1, A2 and A3 extend in a direction perpendicular to the plane P1 including the axis X10. This plane P1 constitutes a plane of symmetry of the device 10, except at the tapping 25. The axes A1 and A3 are situated substantially in a same plane P2 perpendicular to the plane of symmetry P1. In the example of the figures, the plane P2 includes the central axis X10. Alternatively, the plane P2 may be parallel to the axis X10. The plane P1 corresponds to the plane of FIG. 2, while the plane P2 corresponds to the plane of FIGS. 3 and 5.

In practice, between the unlocked configuration and the locked configuration of the mechanism 40, the axis A1 is movable in the plane P2 along the axis X10, while the axis A3 is stationary. The axis A2 is movable on either side of the plane P2, by pivoting of the off-centered lever 60 both around the moving axis A1 and around a stationary axis A3 between the unlocked configuration and locked configuration. The axis A2 is situated globally between the axes A1 and A3 in the longitudinal direction defined by the axis X10. The distance between the axes A1 and A2 is constant and corresponds to the off-centeredness of the surfaces 65 and 66. Likewise, the distance between the axes A12 and A3 is constant and corresponds to the off-centeredness of the surfaces 72 and 75. The distance between the axes A1 and A2 is smaller, approximately 10 times smaller, preferably at least 5 times smaller, than the distance between the axis A2 and the axis A3. In the longitudinal direction of the device 10 defined by the axis X10, the distance between the axes A1 and A3 is smaller in the unlocked configuration relative to the locked configuration of the mechanism 40. When the operator pivots the lever 60 in the direction L1, from the unlocked position to the locked position, the axis A2 crosses through the plane P2 and the mechanism 40 is in its locked configuration, said to be irreversible. This irreversibility prevents any accidental return of the axis A2 to its initial position. In the unlocked configuration, the axis A2 is situated on one side of the plane P2. In the locked configuration, the axis A2 is situated on the other side of the plane P2 and is closer to that plane P2 than in the unlocked configuration.

Alternatively, the mechanism 40 may be configured such that the axis A2 is movable only on one side of the plane P2, by pivoting the off-centered lever 60 both around the moving axis A1 and the stationary axis A3. In that case, the mechanism 40 is not irreversible. In order for the mechanism 40 to be able to be kept in its locked configuration when the lever 60 is in the locked position, the device 10 may be equipped with means for locking that lever 60 and/or another moving element making up the mechanism 40 in the locked position.

According to the invention, the component elements of the mechanism 40 define a first articulation diameter $\phi 1$ between the pusher member 50 and the off-centered lever 60 around the first axis A1, a second articulation diameter $\phi 2$ between the off-centered lever 60 and the connecting rod rings 70 around the second axis A2, and a third articulation diameter $\phi 3$ between the connecting rod member 70 and the rear housing 85 around the third axis A3. The diameters $\phi 1$, $\phi 2$ and $\phi 3$ are shown in FIGS. 3 to 5 and 7.

Figure 1:
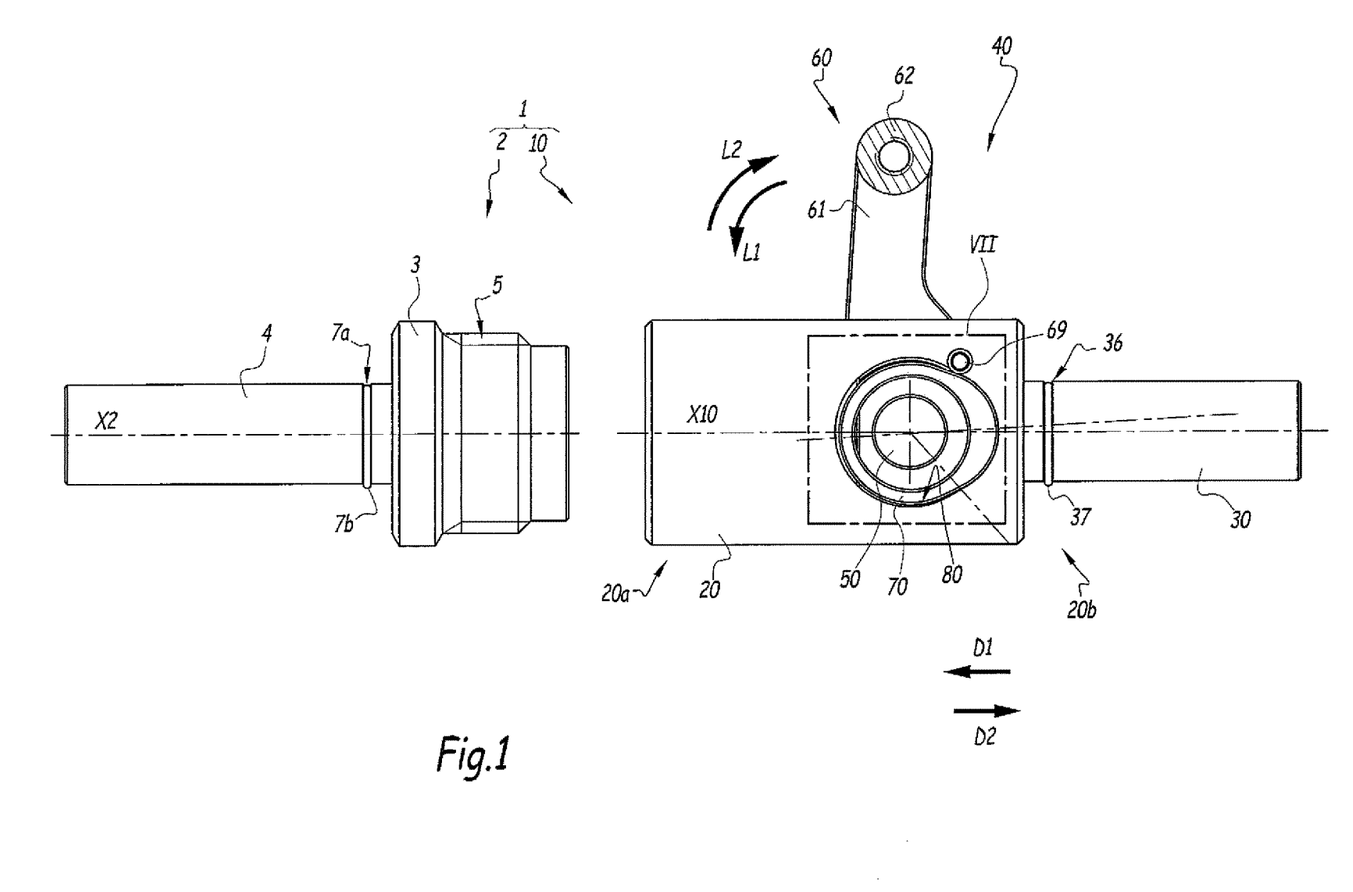
FIG. 1 is a side view of a connector according to the invention, comprising a female connecting device and a male connector end shown in a separated configuration, the device also being according to the invention, a lever belonging to the device being partially shown in the unlocked position.
Figure 8:
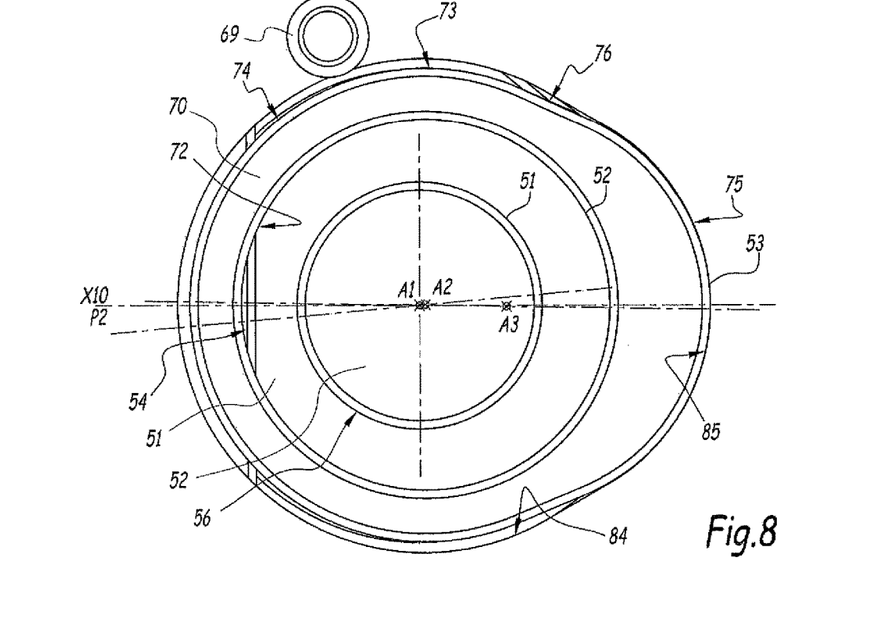
FIG. 8 is a larger scale view of detail VIII in FIG. 4, in a plane similar to FIG. 7, showing the connecting device in the coupled configuration.

For the mechanism 40 of FIGS. 1 and 8, the diameter $\phi 1$ is equal to 5 mm, the diameter $\phi 2$ is equal to 7.5 mm, and the diameter $\phi 3$ is equal to 8.5 mm. The half-sum of the diameters $\phi 1$ and $\phi 2$ is therefore equal to 6.25 mm. The half-sum of the diameters $\phi 2$ and $\phi 3$ is therefore equal to 8 mm. The distance between the axis A1 and the axis A2 is equal to 0.15 mm and the distance between the axis A2 and the axis A3 is equal to 1.5 mm.

The complete operation of the connector 1 and the device 10 are described below.

Figure 2:
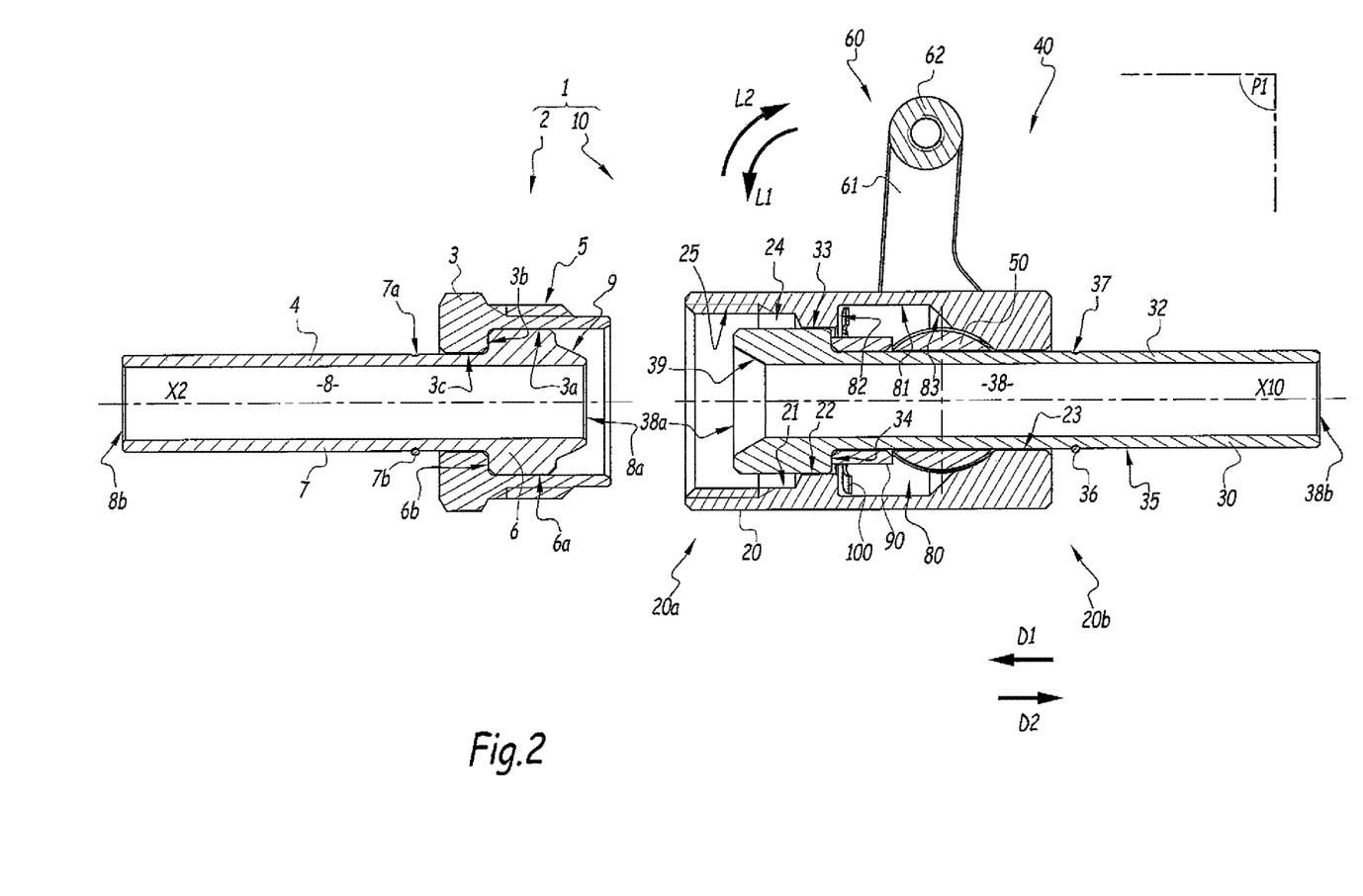
FIG. 2 is an axial cross-section of the connector shown in FIG. 1.
Figure 7:
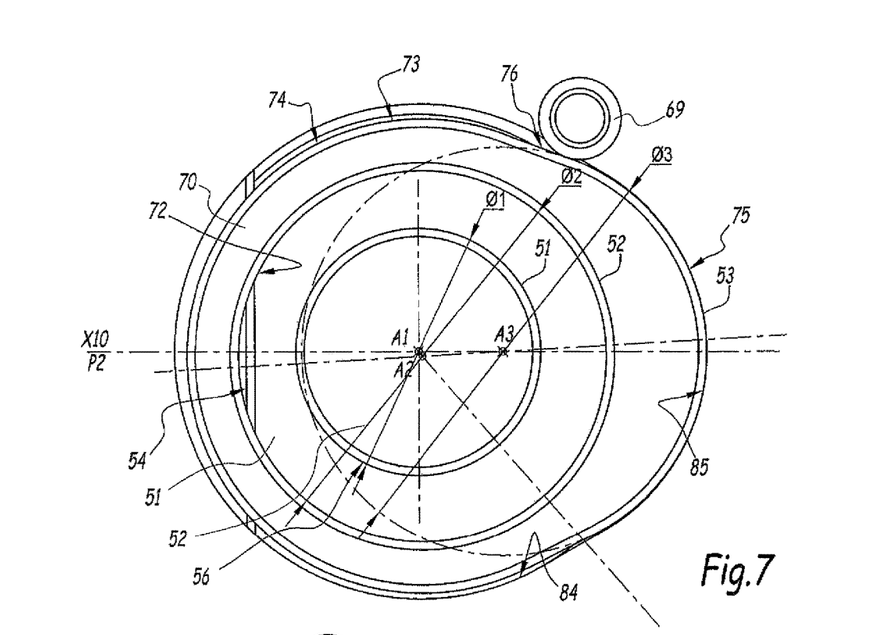
FIG. 7 is a larger scale view of detail VII in FIG. 1, partially showing the connecting device in the separated configuration.

As shown in FIGS. 1, 2 and 7, the connector 1 is initially in the separated configuration, i.e., the connector element 2 and the connecting device 10 are separated. The off-centered lever 60 is in the unlocked position, with the arms 61 extending on either side of the body 20 in a direction globally perpendicular to the axis X1 and the plane P2.

Figure 6:
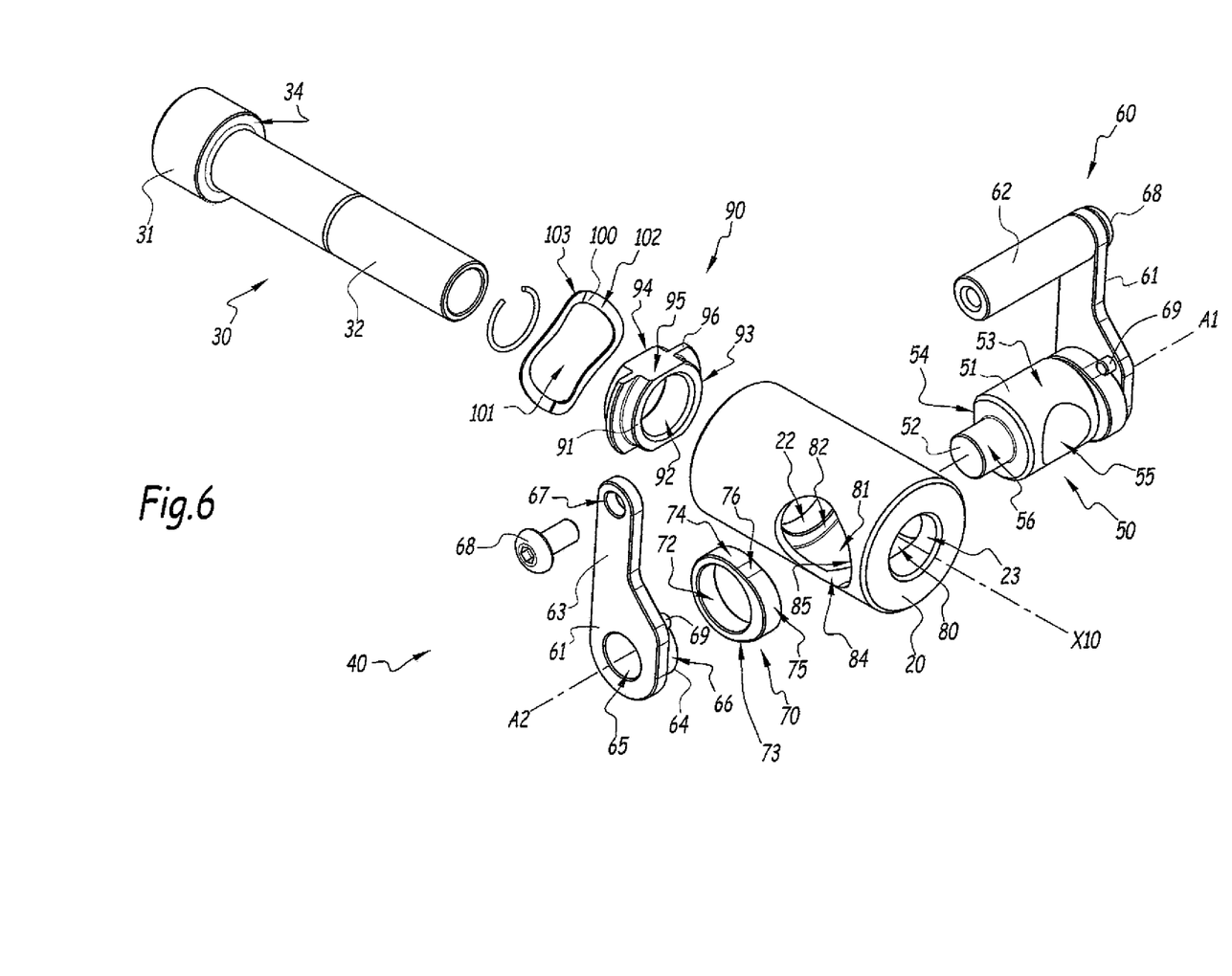
FIG. 6 is a partial exploded perspective view, on another scale, of the connecting device of FIGS. 1 and 5.

As shown in particular in FIGS. 6 and 7, when the device 10 is assembled and the lever 60 is in the unlocked position, each pin 69 supported by the lever 60 bears on one of the planar surfaces 76 of the connecting rod rings 70. This cooperation between the pin 69 and the connecting rod ring 70 limits the angular position of the lever 60 around the axis A1, in other words, prevents the lever 60 from rotating around the axis A1 in the unlocking direction L2. The lever 60 is returned to that position by the spring 100, which pushes the washer 90, the pivot member 50, the off-centered lever 60 and the connecting rod rings 70 in the rear direction D2 to abut backwardly on the body 20. In particular, each rear surface 75 is in rear abutment along the axis X10 in the corresponding bore 85.

As shown in FIG. 3, during a first coupling phase between the element 2 and the device 10, the lever 60 is still in the unlocked position. Each pin 69 cooperates with the planar surface 76 of one of the connecting rod rings 70. The complementary element 2 of the device 10 is screwed into the body 20; more specifically, the thread 5 is screwed into the tapping 25, until the surfaces 9 and 39 come into contact and push the surface 34 of the pipe 30 abutting against the surface 94 of the washer 90, while the surface 6*b* of the pipe 4 is pushed back abutting against the surface 3*b* of the body 3 of the element 2. The body 3 of the element 2 penetrates the inside of the cavity 24 of the body 20, the head 31 of the pipe 30 penetrates inside the cavity 3*a* of the body 3 and the mouth 8*a* of the pipe 4 penetrates inside the mouth 38*a* of the pipe 30. The bodies 3 and 20 are then secured in translation along the axis X10.

Figure 4:
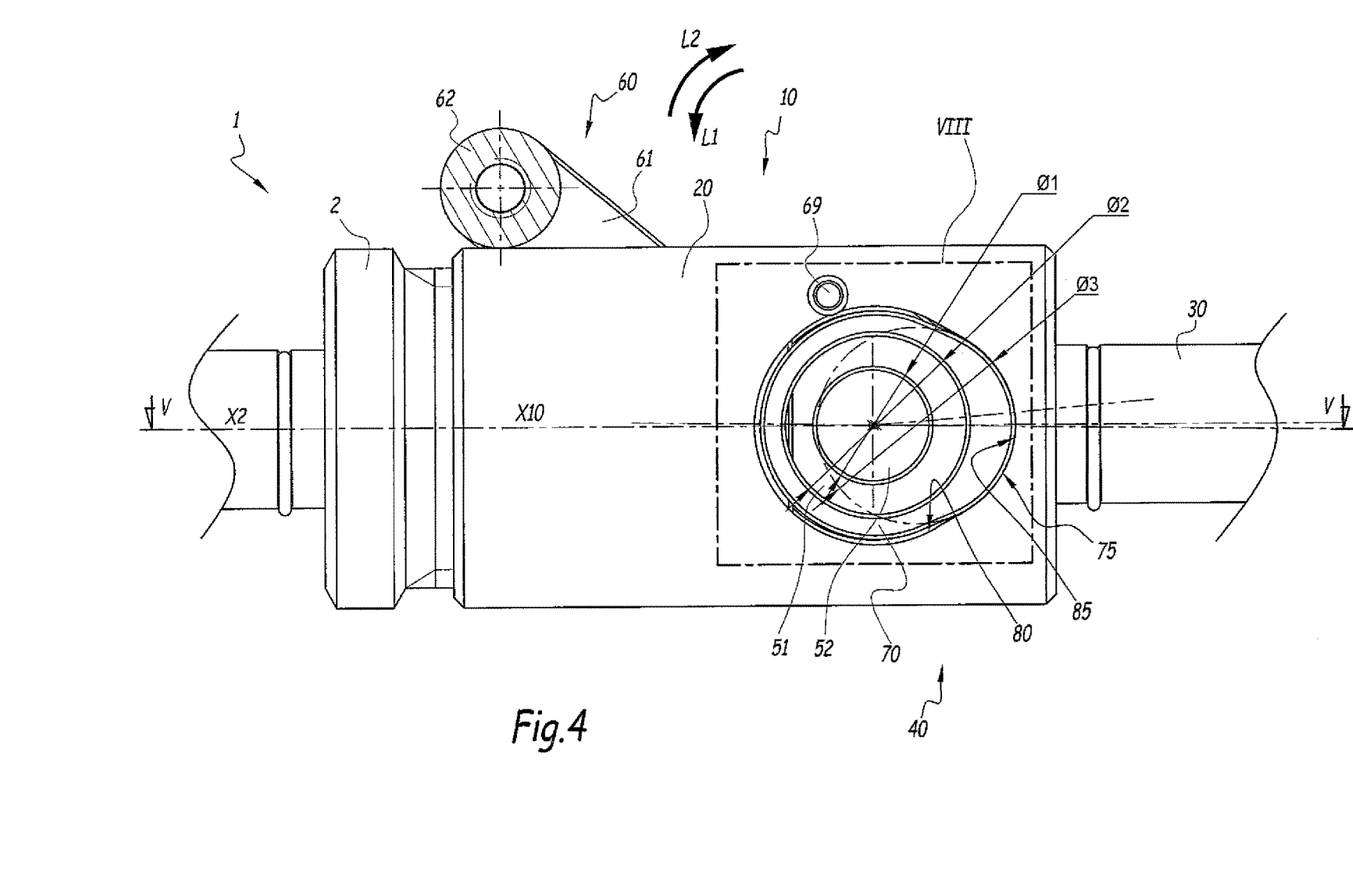
FIG. 4 is a partial side view in a plane similar to FIG. 1, on a larger scale, showing the connector in a coupled configuration, with the lever in the locked position.

As shown in FIGS. 4, 5 and 8, the off-centered lever 60 is next actuated to bring the connector 1 into the coupled configuration. The lever 60 is moved from its unlocked position to its locked position by pivoting in the locking direction L1, with the handle 62 coming closer to the front 20a of the body 20. In other words, the lever 60 is moved from the unlocked configuration to the locked configuration of the displacement mechanism 40. The lever 60 pivots around the axis A1 in the direction L1 by an angle of approximately 50°, that pivoting being limited by the abutment of the handle 62 on the body 20. The rotation of the lever 60 relative to the pusher member 50 is produced around the axis A1 by cooperation of the outer surface 56 with the bore 65, though surfaces defining the articulation diameter φ1. The rotation of the lever 60 also causes the rotation of the off-centered part 66 relative to the connecting rod rings 70 around the axis A2 by cooperation of the bore 72 with the outer surface 66, these surfaces defining the articulation diameter φ2. The connecting rod ring 70 then undergoes a rotation relative to the end body 20 around the axis A3 by the cooperation of the rear outer surface 75 with the bore 85, the surfaces defining the articulation diameter φ3. The axis A2 then crosses through the plane P2 comprising the axes A1 and A3 and the axis X10, between the axis A1 and the axis A3, thereby penetrating an irreversibility zone of the locking, which guarantees maintenance of the mechanism 40 in the locked configuration. The movement of the axis A2 between the unlocked configuration and the locked configuration causes the movement of the axis A1, and therefore the pipe end 30 relative to the body 20, in the forward direction D1 along the axis X10. As an example for a device with standard dimensions 10, the distance between the axes A1 and A3 has increased by approximately 0.05 mm, i.e., the bearing surface 54 of the pusher member 50 on the washer 90, and therefore the bearing surface 94 of the washer 90 on the pipe 30, have moved by 0.05 mm toward the front side 20a of the body 20 during the rotation of the lever 60. This movement makes it possible to bring the pipe 30 and the complementary element 2 closer together, so as to create pressure forces Fp of the surface 9 on the surface 39, thereby forming a sealed connection between the channels 8 and 38 at those complementary surfaces 9 and 39. The pressure forces Fp are shown diagrammatically by arrows in FIG. 5. In reaction to the pressure forces Fp, the surface 39 likewise exerts pressure forces on the surface 9, not shown for simplification purposes. The connector 1 in the coupled configuration is sealed at the interface between the element 2 and the device 10, such that the fluid can circulate through the connection 1.

Upon disconnection, i.e., to go from the coupled configuration to the separated configuration of the connector 1, the lever 60 is rotated around the axis A1 in the unlocking direction L2, with the handle 62 moving away from the front 20a of the body 20. The axis A2 is also moved in the opposite direction, toward its initial position, crossing again through the plane P2 to leave the irreversibility zone. Each pin 69 limits the rotation of the lever 60 by cooperating with the planar surface 76 of the corresponding connecting rod rings 70. The axis A1 moves in the rear direction D2 and the pressure forces Fp exerted by the surface 9 on the surface 39 are released, the sealing within the connector 1 no longer being provided. By unscrewing the head 3 from the body 20, the element 2 and the device 10 are separated.

In an alternative that is not shown, the surfaces 56, 65, 66, 72, 75 and 85 can be offset in a transverse direction parallel to the axes A1, A2, A3. In projection on the plane P1 perpendicular to the axes A1, A2 and A3, the surfaces 66 and 72 surround the surfaces 65 and 56, while the outer surface 73 of the connecting rod ring 70 surrounds the surfaces 66 and 72.

According to another alternative that is not shown, in projection on the plane P1, the surfaces 66 and 65 of the off-centered part 64 do not surround each other, but are secant, i.e., one of the surfaces 66 or 65 is partially contained in the other surface 66 or 65.

Advantageously, in the context of the invention, the mechanism 40 has a reduced bulk in the longitudinal direction since, unlike a traditional toggle lever where the articulations are juxtaposed, the articulations of the mechanism 40 along the axes A1, A2 and A3 are interlocked. The surfaces 56 or 65 and 66 are secant or the surface 56 or the surface 65 surrounds or is surrounded by the surface 66. The surfaces 75 and 72 are secant or the surface 75 surrounds the surface 72. In other words, the distance between the axes A1 and A2 is strictly smaller than the half-sum of the first and second articulation diameters φ1 and φ2, and the distance between the axes A2 and A3 is strictly smaller than the half-sum of the second and third articulation diameters φ2 and φ3. Preferably, the axes A1, A2 and A3 are all positioned inside all of the cylindrical articulation surfaces 55, 65, 66, 72, 75, 85 of the mechanism 40, the articulation surfaces 66 and 72 between the off-centered lever 60 and the connecting rod rings around the articulation surfaces 56 and 65 between the pusher member 50 and the off-centered lever 60, which ensures maximal longitudinal compactness along the axis X10. As a result of this interlocking, the cylindrical or cylinder portion contact interfaces between the elements 50, 60, 70 and 80 in relative rotation are relatively significant and make it possible to achieve a small movement value of the axis A1 between the unlocked configuration and the locked configuration. Furthermore, the planar surface contact interfaces between the translating parts 50, 90 and 30 are relatively large. The increased contact interfaces between the parts of the device 10 make it possible to reduce the contact pressures for a constant actuating force, which allows the use of less hard materials, which are therefore more cost-effective or more specifically suited to certain applications, in particular for cryogenics. The construction with the axis A2 positioned on one side of the plane P2 in the unlocked configuration and positioned on the other side of the plane P2 in the locked configuration allows self-maintenance of the mechanism 40 in the locked configuration and locking with less force when the idle position (axes A1, A2 and A3 contained in the plane P2) is exceeded. The parallelism of the plane P2 comprising the axes A1 and A3 with the central longitudinal axis X10 of the device 10 allows optimal travel for a given locking force. An off-centering between the axis A2 and the axis A3 greater than the off-centering between the axis A1 and the axis A2 allows the mechanism 40 to be maneuvered by the off-centered lever, and also makes it possible to limit the opening of the body 20 by the housing 80 by limiting the rotation of the connecting rod ring 70 between the unlocked configuration and the locked configuration. The mechanism 40 has a reduced bulk outside the end body 20 because the parts 50, 60, 70 are all at least partially positioned inside, i.e., on the side of the axis X10, relative to the outer surface of the end body 20. The surfaces 56, 66, 75 and the bores 65, 72 and 85 are furthermore all positioned, at least partially, at the same level in a transverse direction parallel to the axes A1, A2 and A3, which makes it possible to build simple parts 60, 70 and to achieve a reduced bulk in the radial direction. The maneuvering of the handle 62 of the lever 60, away from the axis A1, allows an operator to exert a significant locking force. The control of the travel of the lever 60 by two end-of-travel stops 62 and 69 guarantees a controlled and reproducible movement value of the pipe 30. In all of the configurations of the mechanism 40, each of the rear bores 85 is positioned behind the axes A1, A2 and A3 along the longitudinal axis X10.

Figure 9:
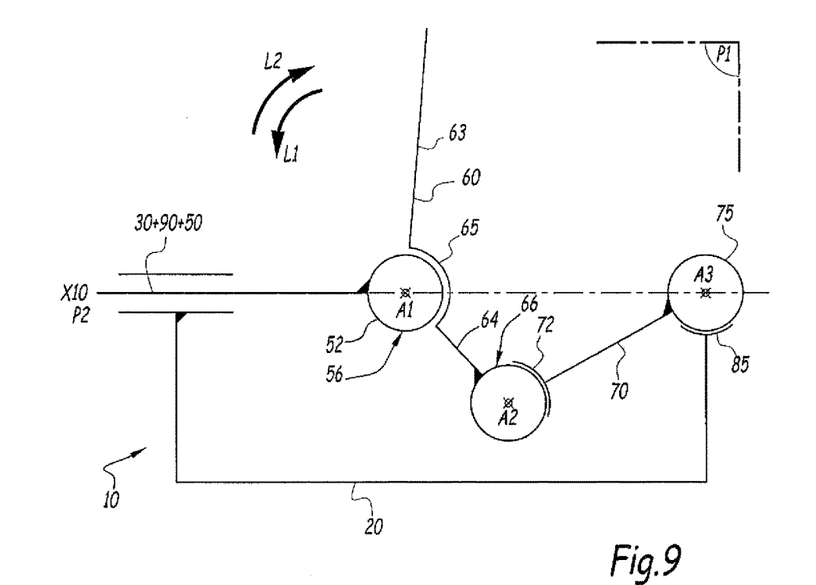
FIG. 9 is a larger scale diagrammatic illustration of a toggle lever mechanism of the state of the art in the unlocked configuration.
Figure 10:
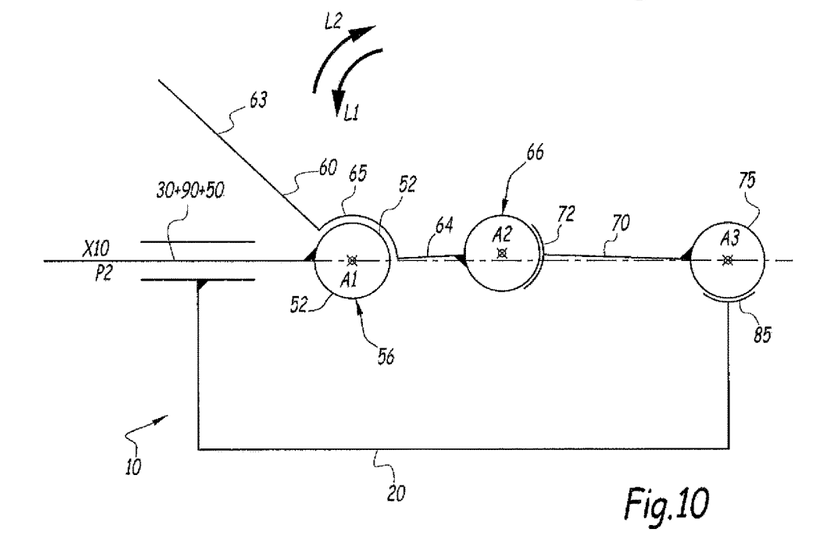
FIG. 10 is a larger scale diagrammatic illustration of a toggle lever mechanism of the state of the art in the unlocked configuration.

FIGS. 9 and 10 kinematically and diagrammatically show the component elements of the device 10, in an arrangement corresponding to a toggle lever of the state of the art, not according to the invention.

Furthermore, the connector 1, the connector element 2 and the connecting device 10 may be configured differently from FIGS. 1 to 8 without going beyond the scope of the invention.

In an alternative that is not shown, the bearing parts 9 and 39 between the element 2 and the pipe end 30 may be configured differently from the example of FIGS. 1 to 8. Preferably, the parts 9 and 39 comprise at least one frustoconical surface to form a direct sealed contact. For example, the parts 9 and 39 both comprise a frustoconical surface. According to another example, the parts 9 and 39 may be configured with the element 2 being female and receiving a male pipe end 30. Preferably, when the sealed contact of the parts 9 and 39 is of the cone trunk/sphere type, the outer female part is provided with a frustoconical end and the inner male part is provided with a partially spherical end.

According to another alternative that is not shown, the sealing within the connector 1 is provided by a metal seal. More specifically, the sealed contact between the element 2 and the pipe end 30 is ensured by means of a metal seal, which the approach of the parts due to actuation of the off-centered lever 60 compresses between the bearing parts 9 and 39 of the element 2 and the pipe end 30 to seal the connection. In this case, the bearing parts 9 and 39 are not necessarily frustoconical or spherical surfaces.

According to another alternative that is not shown, the connector element 2 comprises a female engaging profile, for example a tapping, while the end body 20 comprises a male engaging profile, for example a thread.

According to another alternative that is not shown, the pipe end 30 is not configured in the form of a single-piece tubular body, but is made up of several parts assembled to each other sealably.

According to another alternative that is not shown, a valve system may be positioned inside the channel 8 of the element 2 and/or the main flow channel 38 defined by the pipe end 30. In all cases, the body 20 comprises a dry inner cavity 24, which is a through cavity, isolated from the fluid tunnel, i.e., in which no fluid circulates directly. No fluid flows in the dry inner cavity 24 of the body 20 and on the outer surface of the pipe 30 when the fluid crosses through the connector 1. In other words, the pipe 30 is different from a valve.

According to one particular alternative that is not shown, the off-centered lever 60 includes a least one cylindrical part that is housed in a bore of the pusher member 50. This cylindrical part and this bore are centered on the axis A1.

According to one alternative that is not shown, the off-centered lever 60 includes at least one bore that receives a cylindrical part belonging to the connecting rod ring 70. This bore and this cylindrical part are centered on the axis A2 and off-centered relative to the axis A1.

According to another alternative that is not shown, the off-centered lever 60 includes means for adjusting the position of each pin 69 on the corresponding lever arm 61, in order to adjust the travel of the lever 60 and therefore the pressure forces Fp at the contact surfaces 9 and 39. For example, the pin 69 can be screwed in different locations along a slot formed in the arm 61.

According to another alternative that is not shown, the connector element 2 comprises a pipe 4, a body that extends along a longitudinal axis and is provided with a radial surface including a thread complementary to the thread 25 of the end body 20, as well as a locking mechanism arranged in the threaded body of the element 2, for example with beads or a button, as described in patent application FR 1159652. In that case, the threaded body may engage with the end body 20. The pipe 4 may be locked in position relative to the threaded body of the element 2 owing to a quick locking mechanism. The locking mechanism is movable at least in the separated configuration of the connector between a locked position of the pipe 4 inserted into the body of the connector element 2 relative to the body of the connector element 2, in at least one direction parallel to the longitudinal axis of the body and opposite the device 10, on the one hand, and a position where the locking mechanism allows the pipe 4 to be removed outside the body of the connector element 2, on the other hand.

According to another alternative that is not shown, the mechanism 40 may be configured differently, adapted to this application. For example, the lever 60 comprises a single lever arm 61, a single off-centered part 64 and a single pin 69. In that case, the slide member 50 then comprises a single lateral part 52 housed in that arm 61 and the mechanism 40 comprises a single connecting rod ring 70 positioned around the off-centered part 64 of that arm 61. However, it is preferable for the mechanism 40 to be symmetrical relative to the plane P1 to optimize the distribution of forces, in particular during actuation of the lever 60. The construction of the mechanism 40 with two lever arms 61, two connecting rod rings 70 and two pivot cylinders 52 balances the longitudinal movement of the pusher member 50 in the housing 80 of the body 20, to avoid jamming.

According to another alternative that is not shown, the pusher member 50 and the pipe end 30 are a single piece.

Whatever the embodiment, the displacement means 40 comprise at least one pusher member 50, one off-centered lever 60, one connecting rod ring member 70 and one rear housing 85 that is formed in the end body 20, defining a first articulation diameter $\phi 1$ between the pusher member 50 and the off-centered member 60 around a first axis A1, a second articulation diameter $\phi 2$ between the off-centered member 60 and the connecting rod ring member 70 around a second axis A2, and a third articulation diameter $\phi 3$ between the connecting rod ring member 70 and the rear housing 85 around a third axis A3. The three axes A1, A2, and A3 are separate and parallel to each other. The distance between the axis A1 and the axis A2 is smaller than the half-sum of the articulation diameter $\phi 1$ and the articulation diameter $\phi 2$ and the distance between the axis A2 and the axis A3 is smaller than the half-sum of the articulation diameter $\phi 2$ and the articulation diameter $\phi 3$. The pusher member 50 is movable only in translation along the longitudinal axis X10 relative to the end body 20 and is capable of pushing the end body 30 back in the forward direction D1. Between the unlocked configuration and the locked configuration of the displacement means 40, the off-centered member 60 slides relative to the pusher member 50 along the first articulation diameter $\phi 1$.

Furthermore, the technical characteristics of the different embodiments and alternatives mentioned above may be combined in whole or in part. Thus, the connector and the connecting device according to the invention may be adapted to a specific application, in particular in terms of cost and operational constraints.

The invention claimed is:

1. A connecting device (10), for transmitting pressurized fluids, configured to be coupled with a complementary connector element (2), with a first part (2) among the device and the connecting element that is configured to be a male element adapted for being connected to a first fluid flow line, and a second part among the device and the connector element that is configured to be a female element adapted for being connected to a second fluid flow line, the female element being adapted for receiving the male element, the connecting device (10) comprising:
- a pipe end (30) having an inner flow channel (38) for a fluid flow in the connecting device (10) and including a bearing surface (39) for the connector element (2);
- an end body (20) including a threaded surface (25) for engaging with a body (3) of the connector element (2) and an inner cavity (24) that extends along a longitudinal axis (X10) of the connecting device (10) and is isolated from the inner flow channel (38) when the end body and the connector element are in a coupled configuration; and
- displacement means (40) for moving the pipe end (30) in the cavity (24) of the end body (20) along the longitudinal axis (X10) in a forward direction (D1) between an unlocked configuration and a locked configuration;
wherein the displacement means (40) includes at least one pusher member (50) mounted within the end body (20), at least one off-centered member (60) cooperating with the pusher member for urging the pusher member in the forward direction (D1), at least one connecting rod ring member (70) and at least one rear housing (85) that is formed in the end body (20), defining:
- a first articulation diameter (φ1) between the at least one pusher member (50) and the at least one off-centered member (60) around a first axis (A1),
- a second articulation diameter (φ2) between the at least one off-centered member (60) and the at least one connecting rod ring member (70) around a second axis (A2), and
- a third articulation diameter (φ3) between the at least one connecting rod ring member (70) and the at least one rear housing (85) around a third axis (A3);
wherein the first, second and third axes (A1, A2, A3) are separate and parallel to a direction transverse to the longitudinal axis (X10); wherein a distance between the first axis (A1) and the second axis (A2) is smaller than a half-sum of the first diameter (φ1)) and the second diameter (φ2); wherein a distance between the second axis (A2) and the third axis (A3) is smaller than the half-sum of the second diameter (φ2) and the third diameter (φ3); and wherein the at least one pusher member (50) is movable only in translation along the longitudinal axis (X10) relative to the end body (20) in order to push the pipe end (30) in the forward direction (D1).

2. The connecting device (10) according to claim 1, wherein the at least one off-centered member (60) includes a first cylindrical surface (65) that cooperates with the at least one pusher member (50) to form an articulation with the first articulation diameter (φ1) and a second cylindrical surface (66) that cooperates with the at least one connecting rod ring member (70) to form an articulation with the second articulation diameter (φ2), and wherein the first cylindrical surface (65) surrounds, or is surrounded by, the second cylindrical surface (66) of the at least one off-centered member (60).

3. The connecting device (10) according to claim 2, wherein the at least one connecting rod ring member (70) includes a first cylindrical surface (72) that cooperates with the at least one off-centered member (60) to form the articulation with the second articulation diameter (φ2) and an outer surface (73) including a second cylindrical surface (75) that cooperates with the at least one rear housing (85) to form the articulation with the third articulation diameter (φ3), and wherein the outer surface (73) of the connecting rod ring member (70) surrounds the first cylindrical surface (72) of the connecting rod ring member (70).

4. The connecting device (10) according to claim 3, wherein the at least one off-centered member (60) includes a first cylindrical surface (65) that cooperates with the at least one pusher member (50) to form the articulation with the first articulation diameter (φ1) and a second cylindrical surface (66) that cooperates with the connecting rod ring member (70) to form the articulation with the second articulation diameter (φ2), wherein the first cylindrical surface (65) surrounds, or is surrounded by, the second cylindrical surface (66) of the at least one off-centered member (60), and wherein the at least one rear housing (85), the first cylindrical surface (72) and the second cylindrical surface (75) of the at least one connecting rod ring member (70), the first cylindrical surface (65) and the second cylindrical surface (66) of the at least one off-centered member (60) are positioned at the same level in a direction parallel to the first, second and third axes (A1, A2, A3).

5. The connecting device (10) according to claim 1, wherein the first axis (A1) and the third axis (A3) are situated in a plane (P2) substantially parallel to the longitudinal axis (X10) of the connecting device (10), wherein the second axis (A2) is situated on one side of the plane (P2) in the unlocked configuration of the displacement means (40), and wherein the second axis (A2) is situated on the other side of the plane (P2) in the locked configuration of the displacement means (40).

6. The connecting device (10) according to claim 1, wherein the distance between the first axis (A1) and the second axis (A2) is smaller than the distance between the second axis (A2) and third axis (A3).

7. The connecting device (10) according to claim 1, wherein:
- the at least one pusher member (50) includes at least one cylindrical part (52) centered on the first axis (A1);
- the at least one off-centered member (60) includes a bore (65) receiving the cylindrical part (52) of the at least one pusher member (50) to form the first articulation diameter (φ1) and an outer surface (66) surrounding the bore (65) and centered on the second axis (A2);
- the at least one connecting rod ring member (70) includes a bore (72) receiving the outer surface (66) of the at least one off-centered member (60) to form the second articulation diameter (φ2) and an outer surface (73) surrounding the bore (72); and
- the at least one rear housing is formed by a bore (85) centered on the third axis (A3) and which cooperates with a cylindrical surface (75) of the outer surface (73) of the at least one connecting rod ring member (70) to form the third articulation diameter (φ3).

8. The connecting device (10) according to claim 7, wherein the at least one off-centered member (60) forms a handling lever for the displacement means (40) between the unlocked configuration and locked configuration and includes two lever arms (61) situated on either side of the end body (20), each lever arm (61) cooperating with a pusher member (50), and wherein the displacement means (40) includes:
- two connecting rod ring members (70) each cooperating with one of the lever arms (61) of an off-centered member (60), and
- two rear housings (85) emerging outside the end body (20) and each cooperating with one of the connecting rod ring members (70).

9. The connecting device (10) according to claim 8, wherein the two lever arms (61) are connected by a shaft (62) forming a handle, which abuts against the end body (20) in the locked configuration of the displacement means (40).

10. The connecting device (10) according to claim 1, wherein each off-centered member (60) includes at least one stop (69) bearing against a surface (76) of a connecting rod ring member (70) in the unlocked configuration of the displacement means (40).

11. The connecting device (10) according to claim 1, including elastic return means (100) for returning the displacement means (40) to the unlocked configuration.

12. A connector (1) adapted for transmitting pressurized fluids, comprising:
- a connecting device (10) according to claim 1,
- a complementary connector element (2) that is capable of being coupled to the connecting device (10) and that has a pipe (4) defining a bearing surface (9) complementary to the bearing surface (39) of the connecting device (10), and wherein the bearing surface (9) of the complementary connector element (2) and the bearing surface (39) of the connecting device (10) are in cone trunk-on-cone trunk contact or in sphere portion-on-cone trunk contact to form a connection between the pipe end (20) and the pipe (4).

13. The connector (1) according to claim 12, wherein the complementary connector element (2) includes a locking mechanism movable between a position locking the pipe (4) of the complementary connector element (2) inserted in a body of the complementary connector element (2) relative to a body of the complementary connector element (2), in at least one direction parallel to a longitudinal axis of the complementary connector element (2) and opposite the connecting device (10) and a position where the locking mechanism allows the pipe (4) of the connector element (2) to be removed outside the body of the complementary connector element (2).

* * * * *